(12) United States Patent
Arakawa et al.

(10) Patent No.: US 12,263,604 B2
(45) Date of Patent: Apr. 1, 2025

(54) CONTROL METHOD FOR ROBOT SYSTEM AND ROBOT SYSTEM

(71) Applicant: SEIKO EPSON CORPORATION, Tokyo (JP)

(72) Inventors: Yutaka Arakawa, Suwa-Gun Hara-mura (JP); Tomohisa Iwazaki, Suwa-Gun Shimosuwa-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 272 days.

(21) Appl. No.: 17/875,452

(22) Filed: Jul. 28, 2022

(65) Prior Publication Data

US 2023/0036260 A1 Feb. 2, 2023

(30) Foreign Application Priority Data

Jul. 30, 2021 (JP) .................................. 2021-125103

(51) Int. Cl.
| | | |
|---|---|---|
| *B25J 9/16* | (2006.01) | |
| *B25J 9/00* | (2006.01) | |
| *B25J 13/08* | (2006.01) | |
| *B41J 29/38* | (2006.01) | |

(52) U.S. Cl.
CPC .......... *B25J 9/1697* (2013.01); *B25J 9/0096* (2013.01); *B25J 13/08* (2013.01); *B41J 29/38* (2013.01)

(58) Field of Classification Search
CPC . B41J 29/38; B25J 13/08; B25J 9/0096; B25J 9/1697
See application file for complete search history.

(56) References Cited

U.S. PATENT DOCUMENTS

| | | |
|---|---|---|
| 4,761,085 A | 8/1988 | Angst et al. |
| 9,452,616 B1 | 9/2016 | Mathis et al. |
| 2005/0166413 A1* | 8/2005 | Crampton ............... G01B 11/03 33/503 |
| 2009/0167817 A1 | 7/2009 | Orr |
| 2010/0279013 A1 | 11/2010 | Frankenberger et al. |
| 2012/0249679 A1 | 10/2012 | Beier et al. |
| 2018/0099518 A1 | 4/2018 | Eng et al. |
| 2018/0130233 A1* | 5/2018 | Deck ..................... G01J 3/0275 |

(Continued)

FOREIGN PATENT DOCUMENTS

| | | |
|---|---|---|
| EP | 0284796 A2 | 10/1988 |
| JP | H0231850 A | 2/1990 |

(Continued)

OTHER PUBLICATIONS

Search Report of the First Office Action CN Application No. 2022108940912 issued Jan. 21, 2025.

*Primary Examiner* — David H Banh
(74) *Attorney, Agent, or Firm* — Hui Sun

(57) ABSTRACT

A control method for a robot system includes setting a robot arm in a first attitude, performing work in a first region of an object while moving a tool relative to the object by a moving stage with the first attitude maintained, setting the robot arm in a second attitude, imaging the object using a camera and correcting a position of the tool by driving of the moving stage based on an imaging result with the second attitude maintained, and performing the work in a second region of the object while moving the tool relative to the object by the moving stage with the second attitude maintained.

13 Claims, 13 Drawing Sheets

(56) References Cited

U.S. PATENT DOCUMENTS

| | | | |
|---|---|---|---|
| 2018/0201029 A1* | 7/2018 | Mathis | B41J 2/01 |
| 2018/0281185 A1* | 10/2018 | Toshimitsu | B25J 9/1697 |
| 2019/0091870 A1* | 3/2019 | Hino | B25J 5/007 |
| 2019/0160689 A1 | 5/2019 | Ishii et al. | |
| 2019/0329423 A1 | 10/2019 | Shimodaira | |
| 2019/0337311 A1 | 11/2019 | Fritz et al. | |
| 2019/0374966 A1 | 12/2019 | Thompson et al. | |
| 2020/0276715 A1 | 9/2020 | Masukawa et al. | |
| 2020/0376657 A1* | 12/2020 | Adachi | B25J 9/1697 |
| 2022/0032651 A1* | 2/2022 | Hasegawa | B41J 2/04541 |
| 2022/0274398 A1 | 9/2022 | Tawata | |
| 2022/0288863 A1* | 9/2022 | Nakamura | B29C 64/209 |
| 2022/0297444 A1* | 9/2022 | Hirata | B41J 25/316 |
| 2022/0379337 A1 | 12/2022 | Hozumi et al. | |

FOREIGN PATENT DOCUMENTS

| | | | |
|---|---|---|---|
| JP | H03190687 A | 8/1991 | |
| JP | H06226579 A | 8/1994 | |
| JP | 2003251584 A | 9/2003 | |
| JP | 2011180059 A | 9/2011 | |
| JP | 2012206116 A | 10/2012 | |
| JP | 2016068290 A | 5/2016 | |
| JP | 2016221602 A | 12/2016 | |
| JP | 2016221958 A | 12/2016 | |
| JP | 2019188521 A | 10/2019 | |
| JP | 2019188542 A | 10/2019 | |
| JP | 2020138292 A | 9/2020 | |
| JP | 2020163499 A | 10/2020 | |

* cited by examiner

US 12,263,604 B2

CONTROL METHOD FOR ROBOT SYSTEM AND ROBOT SYSTEM

The present application is based on, and claims priority from JP Application Serial Number 2021-125103, filed Jul. 30, 2021, the disclosure of which is hereby incorporated by reference herein in its entirety.

BACKGROUND

1. Technical Field

The present disclosure relates to a control method for a robot system and a robot system.

2. Related Art

JP-A-2-31850 discloses a robot system having a robot with a spray nozzle supported by a distal end of a robot arm via a head slide unit and painting a surface of an object by spraying paint from the spray nozzle. In the robot system, the entire object is painted by repetition of a moving step of moving the robot arm to set the spray nozzle to face an unpainted region of the object and a painting step of performing painting work of the unpainted region while moving the spray nozzle relative to the object using the head slide unit with the robot arm stopped.

However, when printing is performed using the robot system of JP-A-2-31850 and an inkjet head, a region printed at this printing step may deviate from a region printed at the previous step and printing quality may be lower.

SUMMARY

A control method for a robot system according to an aspect of the present disclosure is a control method for a robot system including a moving stage, a tool attached to the moving stage, a robot arm holding one of the moving stage and an object, and a camera and performing predetermined work on the object using the tool, including setting the robot arm in a first attitude, performing the work in a first region of the object while moving the tool relative to the object by the moving stage with the first attitude maintained, setting the robot arm in a second attitude, imaging the object using the camera and correcting a position of the tool by driving of the moving stage based on an imaging result with the second attitude maintained, and performing the work in a second region of the object while moving the tool relative to the object by the moving stage with the second attitude maintained.

A robot system according to an aspect of the present disclosure is a robot system including a moving stage, a tool attached to the moving stage, a robot arm holding one of the moving stage and an object, and a camera and performing predetermined work on the object using the tool, setting the robot arm in a first attitude, performing the work in a first region of the object while moving the tool relative to the object by the moving stage with the first attitude maintained, setting the robot arm in a second attitude, imaging the object using the camera and correcting a position of the tool by driving of the moving stage based on an imaging result with the second attitude maintained, and performing the work in a second region of the object while moving the tool relative to the object by the moving stage with the second attitude maintained.

DESCRIPTION OF EXEMPLARY EMBODIMENTS

As below, preferred embodiments of a control method for a robot system and a robot system will be explained with reference to the accompanying drawings.

First Embodiment

Figure 1:
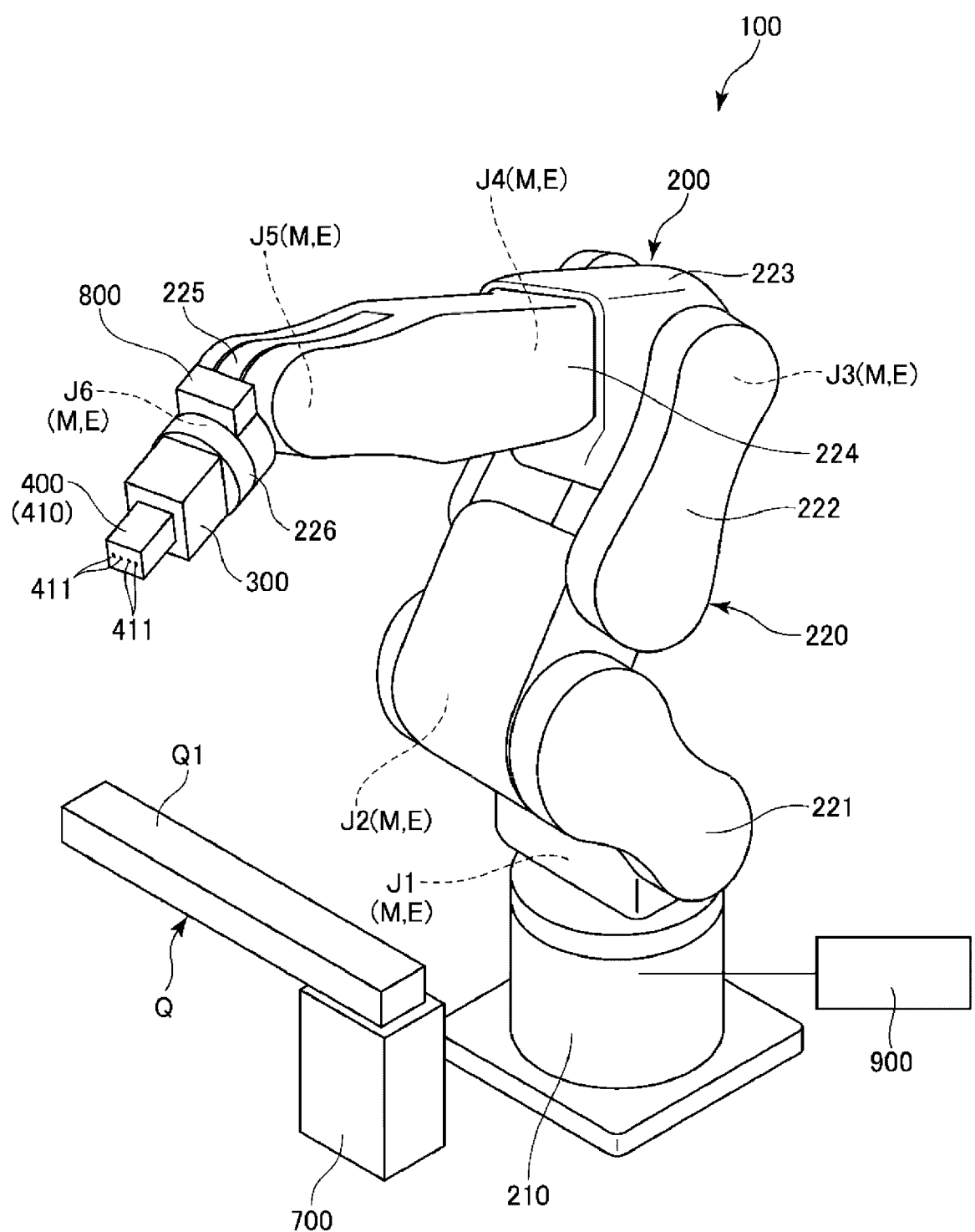
FIG. 1 is a perspective view showing an overall configuration of a robot system according to a first embodiment.
Figure 2:
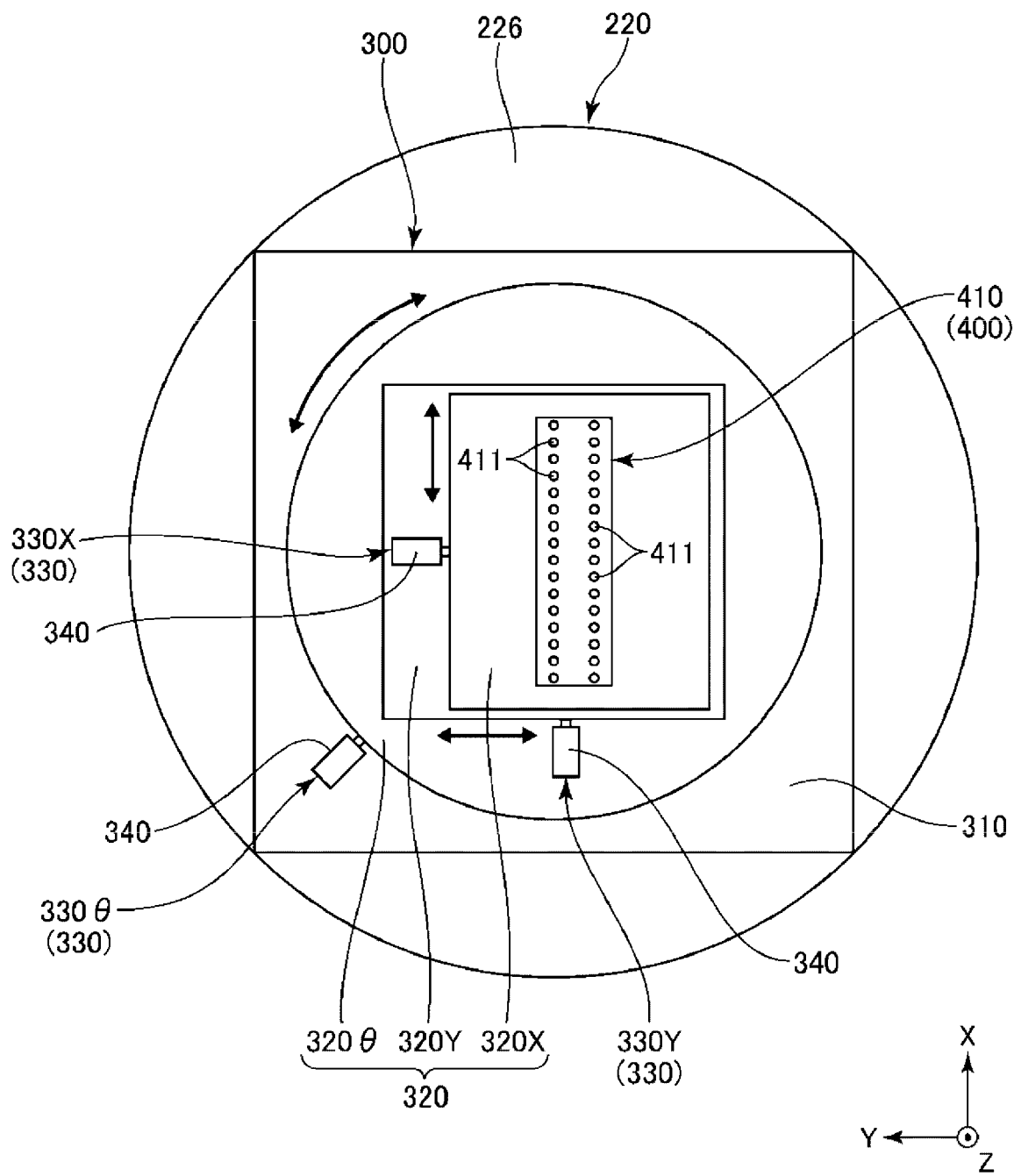
FIG. 2 is a plan view showing a moving stage.
Figure 3:
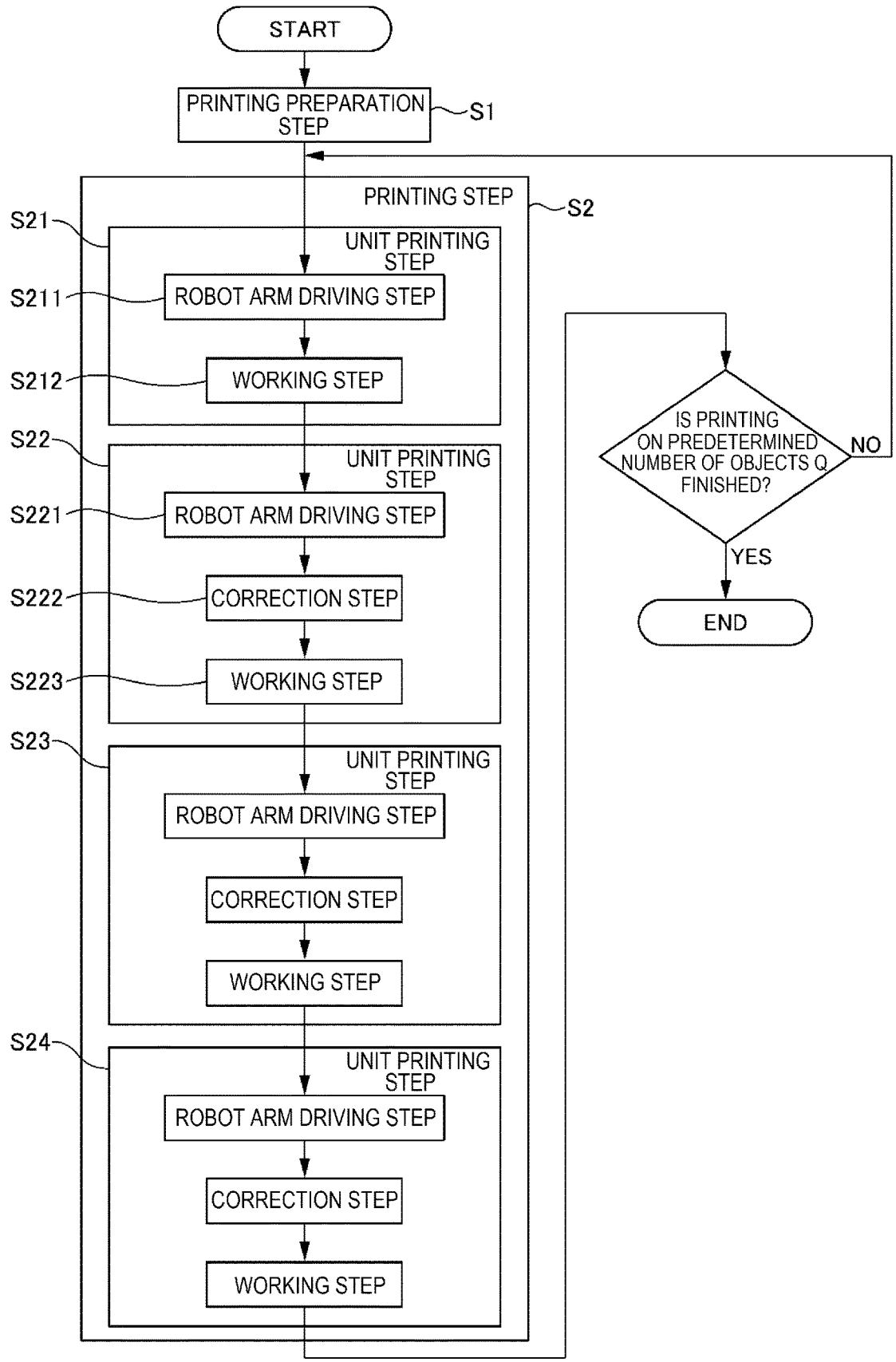
FIG. 3 is a flowchart showing a printing process.
Figure 4:
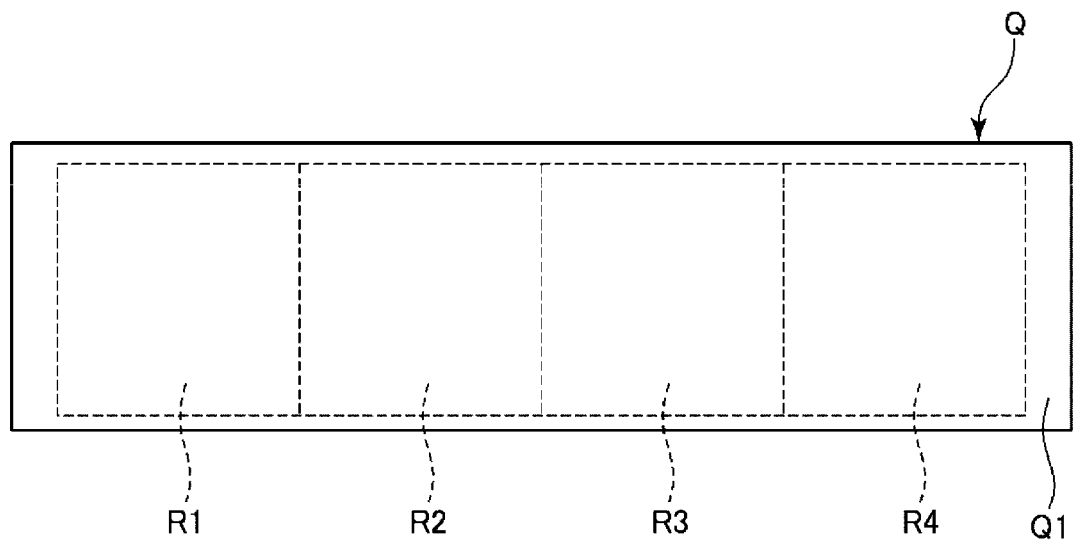
FIG. 4 shows a state in which a printing face is divided into a plurality of regions.
Figure 12:
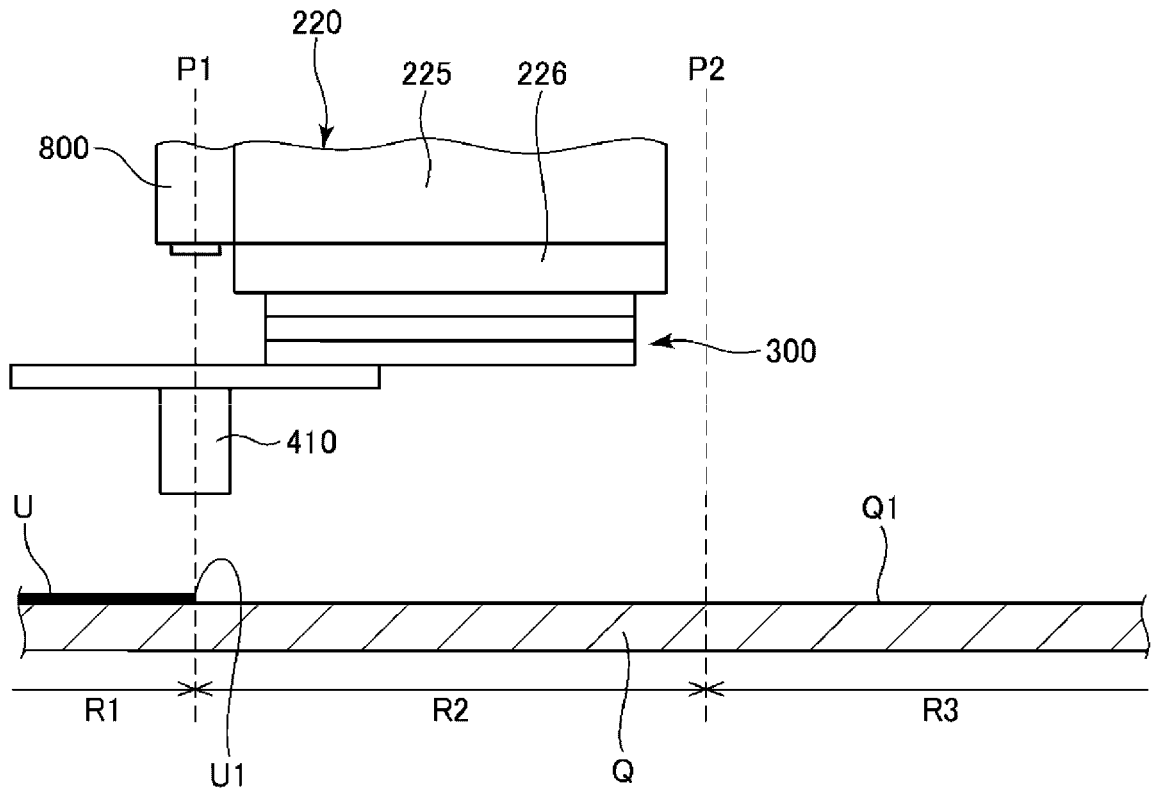
FIG. 12 is a diagram for explanation of a motion of the robot system at the printing step.
Figure 13:
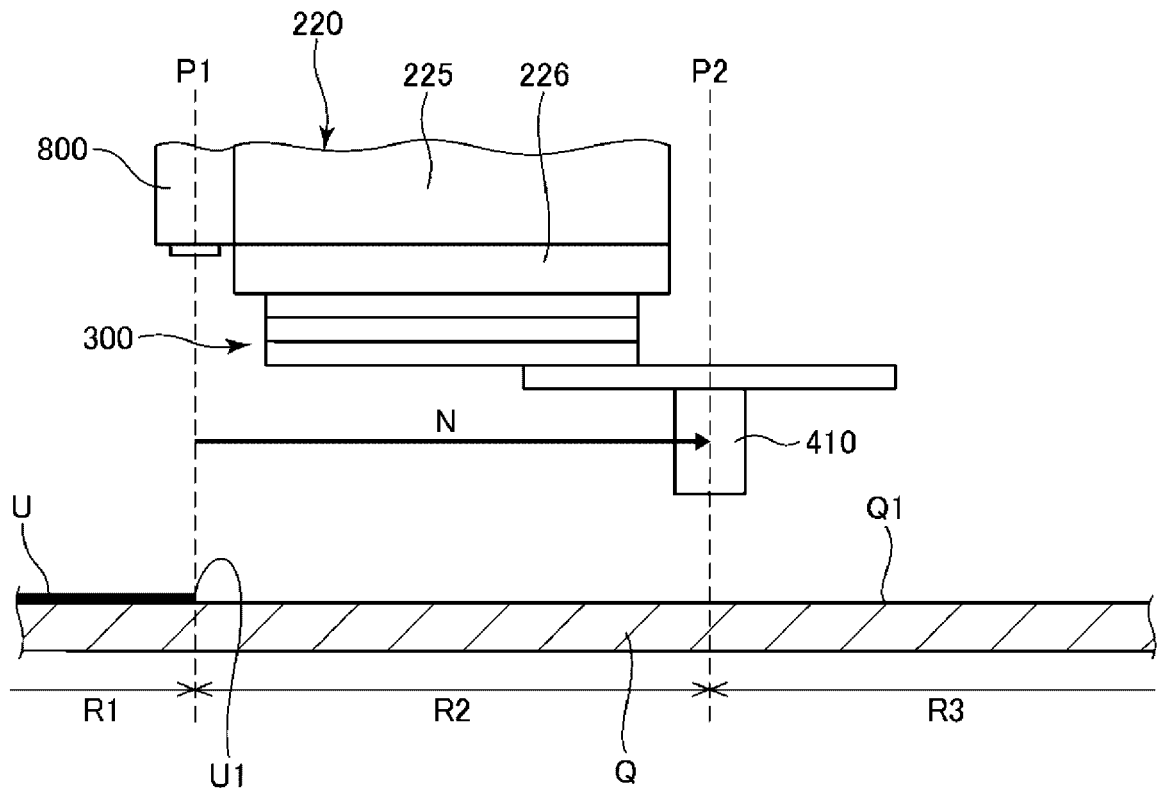
FIG. 13 is a diagram for explanation of a motion of the robot system at the printing step.
Figure 14:
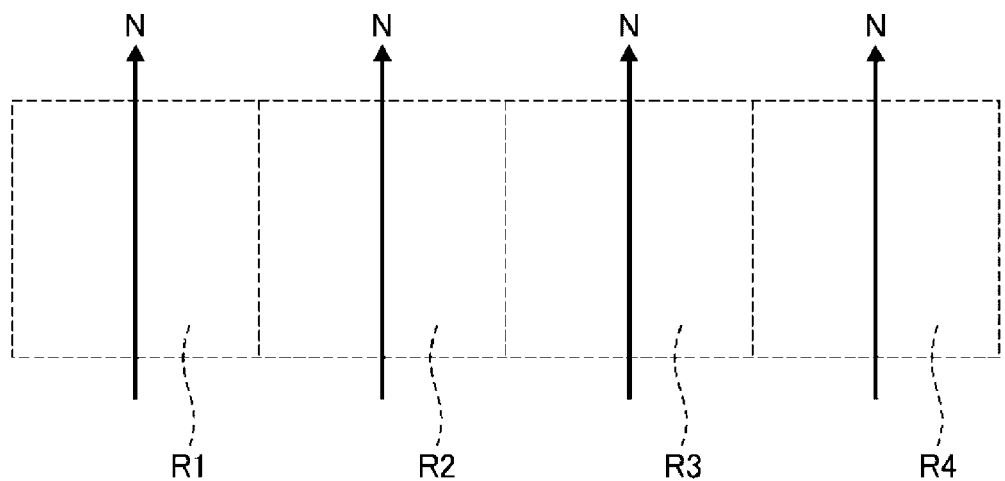
FIG. 14 shows a modified example of a printing method.
Figure 15:
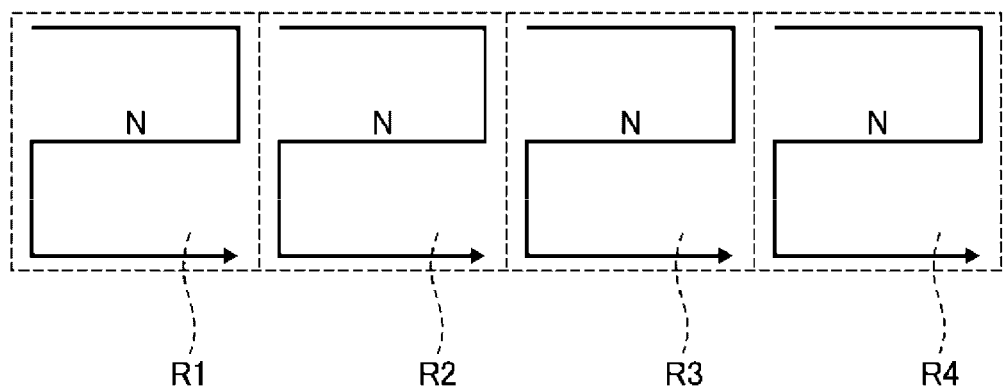
FIG. 15 shows a modified example of the printing method.
Figure 16:
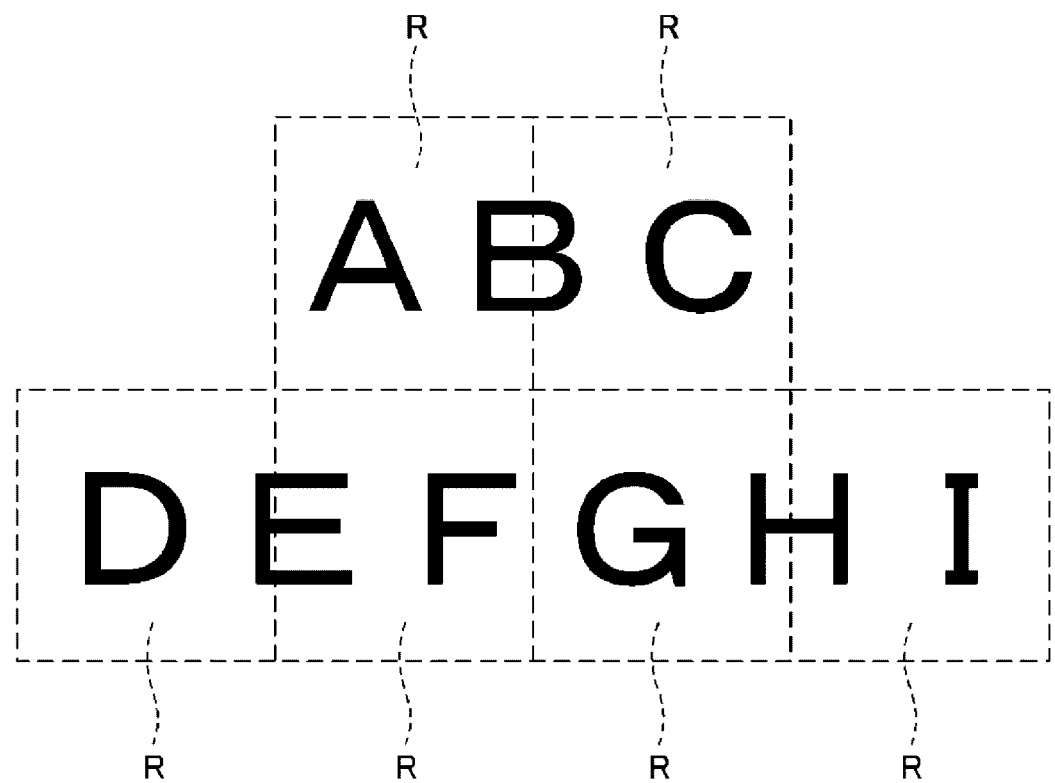
FIG. 16 shows a modified example of the printing method.
Figure 17:
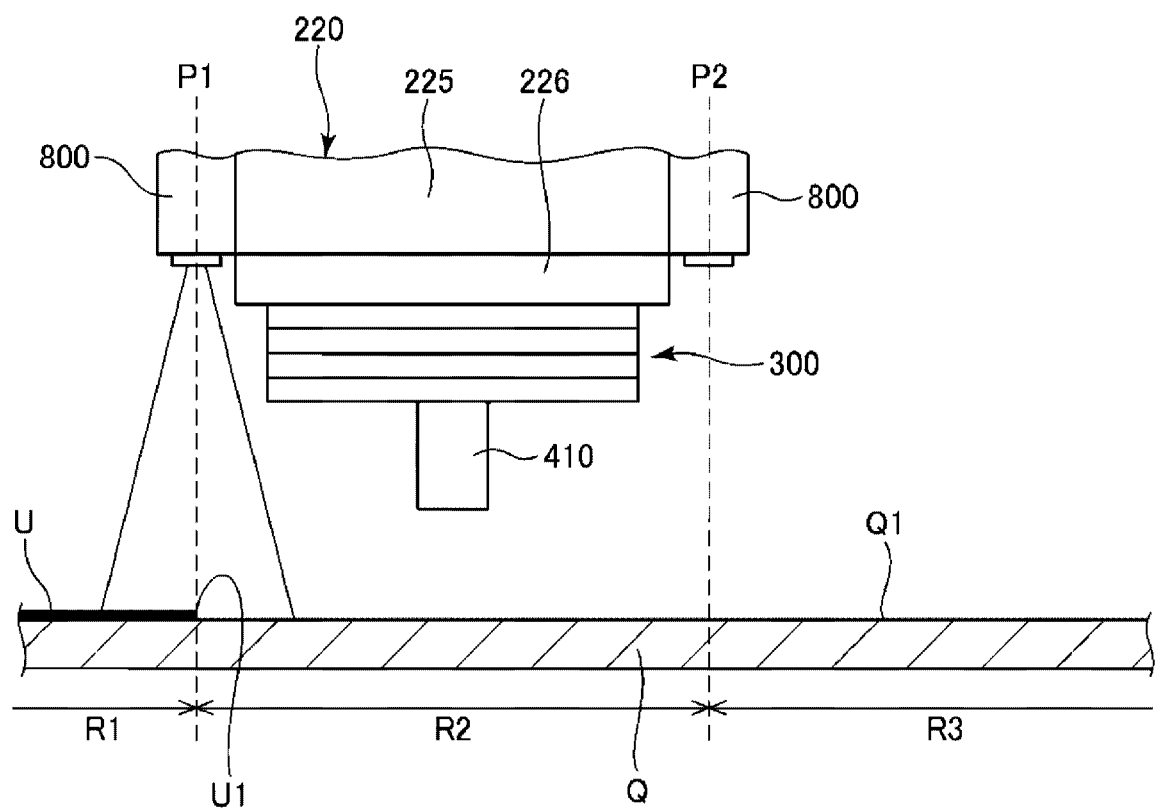
FIG. 17 shows a modified example of the robot system.

FIG. 1 is a perspective view showing an overall configuration of a robot system according to a first embodiment. FIG. 2 is a plan view showing a moving stage. FIG. 3 is a flowchart showing a printing process. FIG. 4 shows a state in which a printing face is divided into a plurality of regions. FIGS. 5 to 8 are respectively diagrams for explanation of motions of the robot system at a printing step. FIG. 9 is a diagram for explanation of an effect of the printing step. FIGS. 10 to 13 are respectively diagrams for explanation of motions of the robot system at the printing step. FIGS. 14 to 16 show modified examples of a printing method. FIG. 17 shows a modified example of the robot system.

A robot system 100 shown in FIG. 1 has a robot 200, a robot control apparatus 900 controlling driving of the robot 200, a fixing member 700 supporting and fixing an object Q, and a camera 800.

The robot 200 is a six-axis robot having six drive axes. The robot 200 has a base 210 fixed to a floor, a robot arm 220 coupled to the base 210, and a tool 400 coupled to the robot arm 220 via a moving stage 300.

The robot arm 220 is a robotic arm in which a plurality of arms 221, 222, 223, 224, 225, 226 are pivotably coupled and includes six joints J1 to J6. Of the joints, the joints J2, J3, J5 are bending joints and the joints J1, J4, J6 are twisting joints. Further, motors M as drive sources and encoders E detecting rotation amounts of the motors M (pivot angles of the arms) are respectively provided in the joints J1, J2, J3, J4, J5, J6.

The tool 400 is coupled to the distal end portion of the arm 226 via the moving stage 300. That is, the moving stage 300 is held by the arm 226 and the tool 400 is attached to the moving stage 300. The tool 400 is not particularly limited, but may be appropriately set for intended work. In the embodiment, a printer head, particularly, an inkjet head 410 is used. The inkjet head 410 has an ink chamber and a vibrating plate placed on a wall surface of the ink chamber (not shown) and ink ejection holes 411 connecting to the ink chamber, and is configured so that ink within the ink chamber is ejected from the ink ejection holes 411 by vibration of the vibrating plate. Note that the configuration of the inkjet head 410 is not particularly limited. Further, the printer head is not limited to the inkjet head 410.

As shown in FIG. 2, the moving stage 300 coupling the inkjet head 410 and the robot arm 220 has a base portion 310 coupled to the arm 226, a stage 320 moving relative to the base portion 310, and a movement mechanism 330 moving the stage 320 relative to the base portion 310. With three axes orthogonal to one another as an X-axis, a Y-axis, and a Z-axis, the stage 320 has a θ stage 320θ rotatable around the Z-axis relative to the base portion 310, a Y stage 320Y movable in directions along the Y-axis relative to the θ stage 320θ, and an X stage 320X movable in directions along the X-axis relative to the Y stage 320Y, and the inkjet head 410 is attached to the X stage 320X. The X stage 320X and the Y stage 320Y are linearly guided in the X-axis directions and the Y-axis directions, respectively, by linear guides, and may smoothly move without rattle in rail directions of the linear guides.

Further, the movement mechanism 330 has a θ movement mechanism 330θ moving the θ stage 320θ around the Z-axis relative to the base portion 310, a Y movement mechanism 330Y moving the Y stage 320Y in the directions along the Y-axis relative to the θ stage 320θ, and an X movement mechanism 330X moving the X stage 320X in the directions along the X-axis relative to the Y stage 320Y.

The θ movement mechanism 330θ, the Y movement mechanism 330Y, and the X movement mechanism 330X respectively have piezoelectric actuators 340 as drive sources. Thereby, the size and weight of the moving stage 300 may be reduced. Direct driving may be performed without using reducers, and thereby, the size and weight may be further reduced. Further, driving accuracy of the moving stage 300 is improved. Note that the piezoelectric actuators 340 have configurations vibrating using expansion and contraction of piezoelectric elements, and the vibration is transmitted to the respective stages 320θ, 320X, 320Y to move the respective stages 320θ, 320X, 320Y. The drive sources are not particularly limited, but e.g. electromagnetic motors may be used.

As shown in FIG. 1, the camera 800 is placed on the arm 225 to face the distal end side of the robot arm 220. The camera 800 is placed on the robot arm 220, and thereby, the object Q may be imaged by the camera 800 from a relatively close range and clearer image data D may be obtained. For example, in comparison to a case where the camera 800 is placed on the moving stage 300 as in a second embodiment, which will be described later, the load on the moving stage 300 is lower and the acceleration and deceleration of the moving stage 300 may be set to be higher by the smaller load. Accordingly, the time taken for the work may be shortened and productivity is improved.

A relationship of the inkjet head 410 positioned at the distal end side of the arm 225 is maintained regardless of how the respective other arms 221 to 224, 226 than the arm 225 move. Accordingly, the camera 800 is placed on the arm 225, and thereby, the camera 800 may constantly image the distal end side of the inkjet head 410. Therefore, regarding an attitude when printing is performed on the object Q using the inkjet head 410, that is, in any attitude in which the inkjet head 410 faces the object Q, the object Q may be imaged in the attitude. Note that the placement of the camera 800 is not particularly limited, but the camera may be placed in the arms 221 to 224 or 226.

The camera 800 is a spectroscopic camera and may acquire spectroscopic data (spectral information) with respect to each pixel in addition to a planar image. Accordingly, image recognition based on the image data D acquired by the camera 800 may be performed with higher accuracy. Note that the camera 800 is not particularly limited.

The robot control apparatus 900 controls driving of the joints J1 to J6, the moving state 300, the inkjet head 410, and the camera 800 to control the robot 200 to perform predetermined work, which will be described later. The robot control apparatus 900 includes e.g. a computer having a processor (CPU) processing information, a memory communicably connected to the processor, and an external interface. Various programs that can be executed by the processor are stored in the memory, and the processor may read and execute the various programs etc. stored in the memory.

As above, the configuration of the robot system 100 is explained. The robot control apparatus 900 controls the respective units of the system, and thereby, for example, as shown in FIG. 1, the robot system 100 may perform work to print a desired pattern on a printing face Q1 provided on a surface of the object Q using the inkjet head 410 (hereinafter, also simply referred to as "printing work").

As shown in FIG. 3, the printing work includes a printing preparation step S1 and a printing step S2 of printing on the printing face Q1. As below, the respective steps will be sequentially explained.

Printing Preparation Step S1

At the printing preparation step S1, first, the shape of the printing face Q1 is calculated. In the embodiment, CAD data as 3D data of the object Q is acquired in advance and the shape of the printing face Q1 is calculated based on the CAD data. Thereby, the shape of the printing face Q1 may be calculated more simply and accurately.

Note that the method of calculating the shape of the printing face Q1 is not particularly limited. For example, the shape of the printing face Q1 may be calculated based on imaging data of the object Q acquired by the camera 800 or another camera. Or, the shape of the printing face Q1 may be calculated using a depth sensor, or the shape of the printing face Q1 may be calculated by the phase shift method using a projector projecting a striped light pattern on the printing face Q1 and a camera imaging the printing face Q1 on which the light pattern is radiated.

Then, the printing face Q1 is divided into a plurality of regions R based on the shape of the printing face Q1. For example, in the example shown in FIG. 4, the printing face Q1 is equally divided into four regions R1, R2, R3, R4 arranged in a line. Note that the division method into the plurality of regions R is not particularly limited, but sizes and shapes may be different from one another and the regions are not necessarily arranged in a line.

Then, the order of printing of the four regions R1, R2, R3, R4 is determined. In the embodiment, the regions R1, R2, R3, R4 are sequentially printed in the order of the arrangement. Thereby, unnecessary motion of the robot 200 during the printing work is reduced and the printing step S2 may be efficiently performed. Accordingly, the takt time becomes shorter and the productivity is improved. Note that the order of printing is not particularly limited.

Further, activation conditions of the robot 200 in the respective regions R1, R2, R3, R4 are determined. The activation conditions are not particularly limited to, but include e.g. the attitudes, movement trajectories, accelerations, decelerations, and maximum velocities of the robot arm 220 in the respective regions R1, R2, R3, R4 and output conditions of ink ejection amounts, ink ejection intervals, etc. of the inkjet head 410.

Printing Step S2

The printing step S2 is a step of printing on the printing face Q1 using the inkjet head 410. The printing step S2 is performed based on the activation conditions determined at the printing preparation step S1, and includes a unit printing step S21 of printing in the region R1, a unit printing step S22 of printing in the region R2, a unit printing step S23 of printing in the region R3, a unit printing step S24 of printing in the region R4 as shown in FIG. 3.

Figure 6:
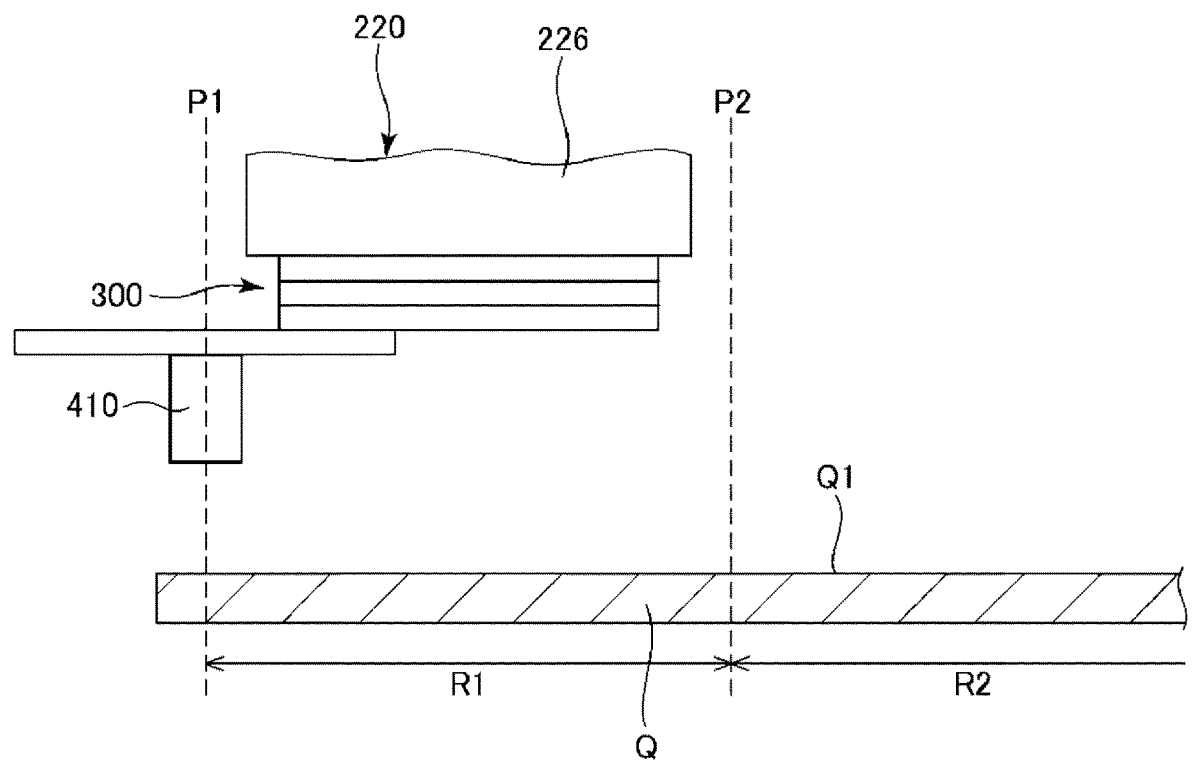
FIG. 6 is a diagram for explanation of a motion of the robot system at the printing step.
Figure 7:
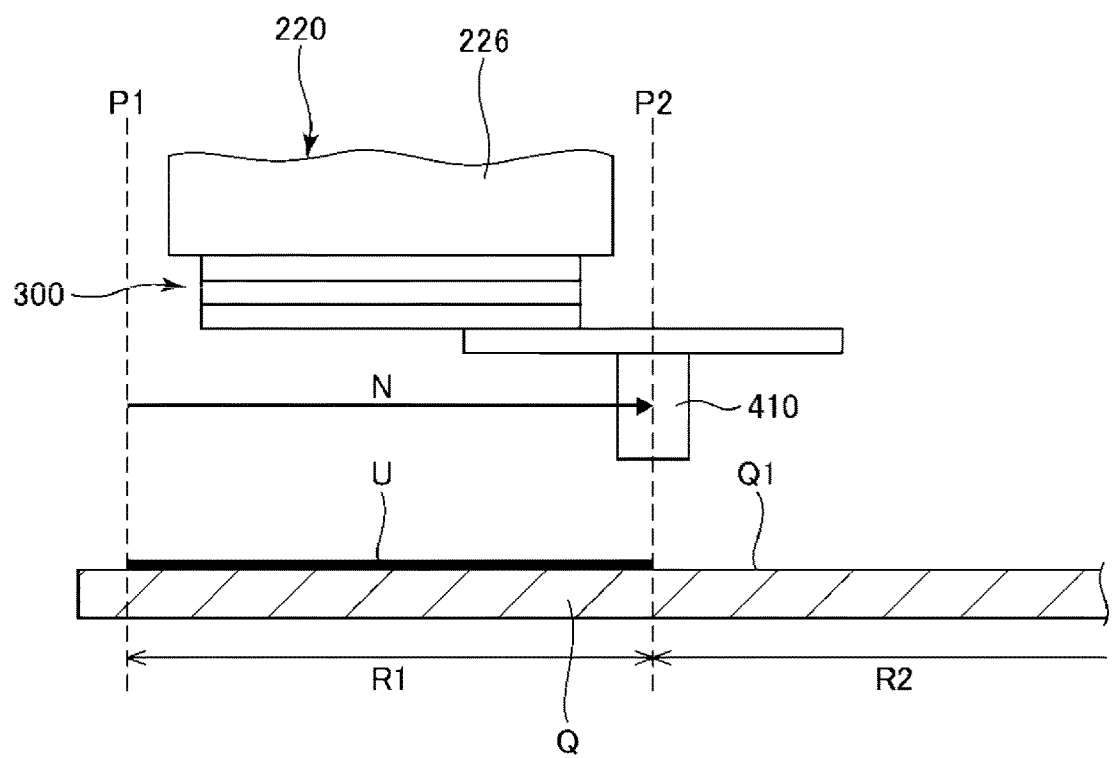
FIG. 7 is a diagram for explanation of a motion of the robot system at the printing step.

Note that the unit printing steps S23, S24 are repetition of the unit printing step S22 and, as below, only the unit printing steps S21, S22 will be explained with reference to FIGS. 5 to 7 and the explanation of the unit printing steps S23, S24 will be omitted.

Unit Printing Step S21

The unit printing step S21 includes a robot arm driving step S211 of setting the robot arm 220 in a first attitude, and a working step S212 of performing printing in the region R1 while moving the inkjet head 410 relative to the object Q by the moving stage 300 with the first attitude maintained.

Figure 5:
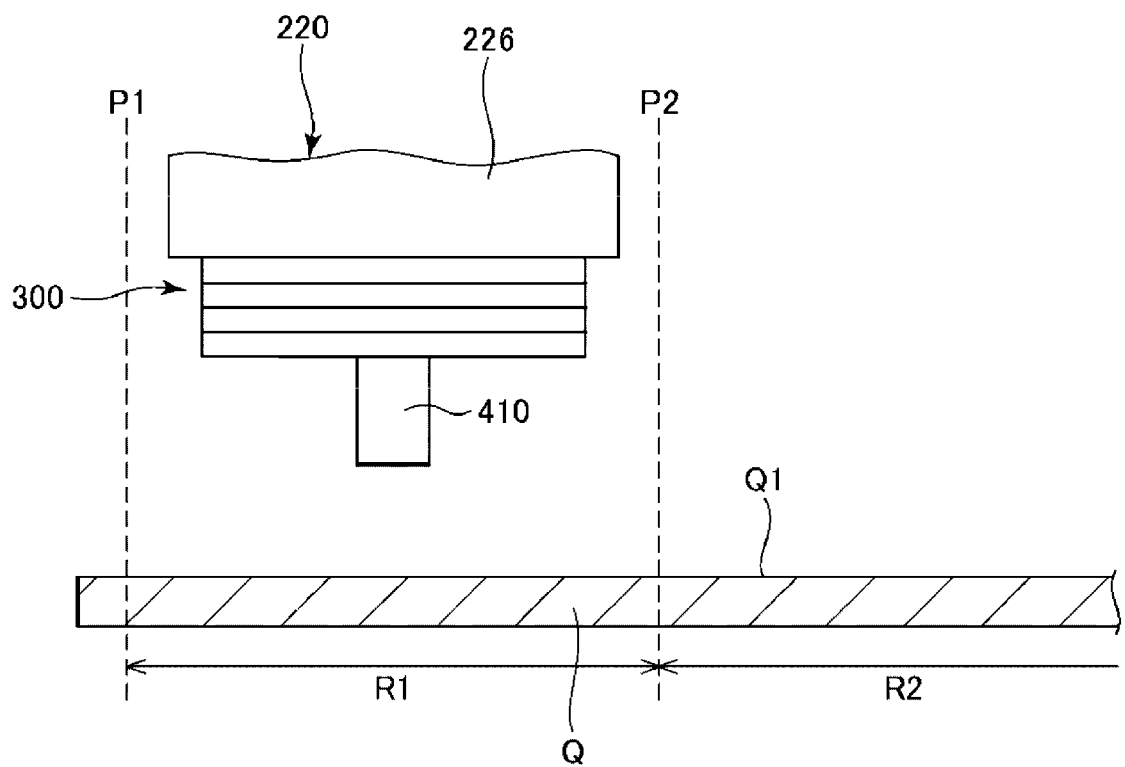
FIG. 5 is a diagram for explanation of a motion of the robot system at a printing step.

At the robot arm driving step S211, as shown in FIG. 5, the robot arm 220 is driven into the first attitude to set the inkjet head 410 to face the region R1. The separation distance between the inkjet head 410 and the region R1 is set within a proper gap preset for the inkjet head 410. Further, in the first attitude, the movable range of the inkjet head 410 by driving of the moving stage 300 overlaps with the entire region R1.

Then, with the robot arm 220 maintained in the first attitude, that is, without moving the robot arm 220, the working step S212 is performed. At the working step S212, first, as shown in FIG. 6, the moving stage 300 is driven to move the inkjet head 410 to a movement start position P1. Then, as shown in FIG. 7, while the moving stage 300 is driven to move the inkjet head 410 from the movement start position P1 to a movement end position P2 along an arrow N, printing in the region R1 is performed by ejection of the ink from the inkjet head 410 with predetermined timing.

Unit Printing Step S22

As shown in FIG. 3, the unit printing step S22 includes a robot arm driving step S221 of setting the robot arm 220 from the first attitude into a second attitude, a correction step S222 of imaging the object Q using the camera 800 and correcting the position of the inkjet head 410 based on the imaging result, and a working step S223 of performing printing in the region R2 while moving the inkjet head 410 relative to the object Q by the moving stage 300.

Figure 8:
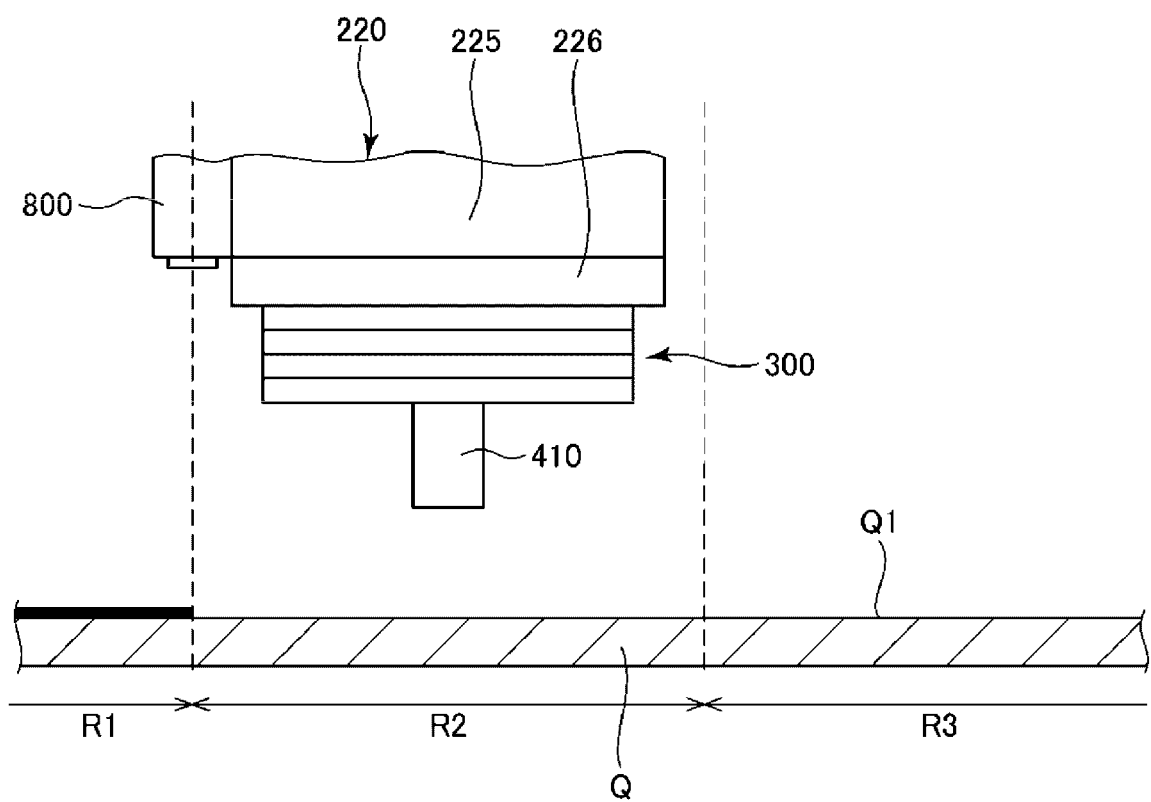
FIG. 8 is a diagram for explanation of a motion of the robot system at the printing step.
Figure 9:
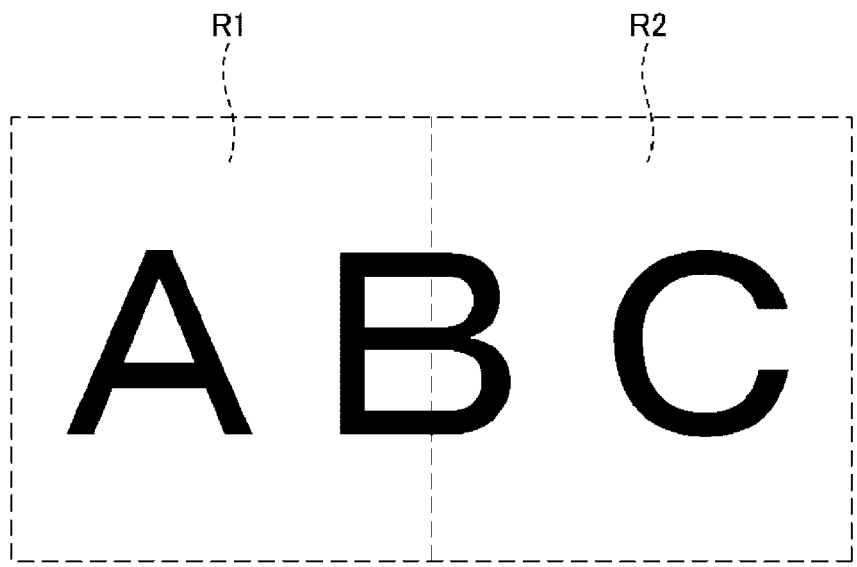
FIG. 9 is a diagram for explanation of an effect of the printing step.
Figure 9:
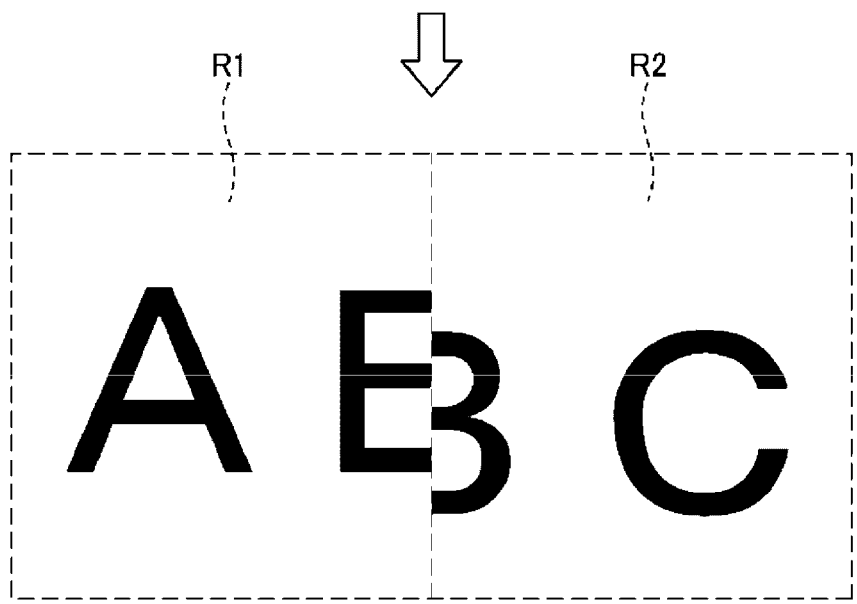

At the robot arm driving step S221, as shown in FIG. 8, the robot arm 220 is driven into the second attitude to set the inkjet head 410 to face the region R2. The separation distance between the inkjet head 410 and the region R2 is set within a proper gap preset for the inkjet head 410. Further, in the second attitude, the movable range of the inkjet head 410 by driving of the moving stage 300 overlaps with the entire region R2.

Here, when the robot arm 220 is changed from the first attitude to the second attitude, the real movement trajectory may be deviated from the designated movement trajectory and the real position of the inkjet head 410 in the second attitude may be deviated from the designated position. As described above, when printing is performed in the region R2 with the real position of the inkjet head 410 deviated from the designated position, as shown in FIG. 9, printing misalignment occurs at the joint between the regions R1, R2 and printing quality becomes lower. Accordingly, at the next correction step S222, the position of the inkjet head 410 is corrected to suppress the printing misalignment at the joint between the regions R1, R2.

Figure 10:
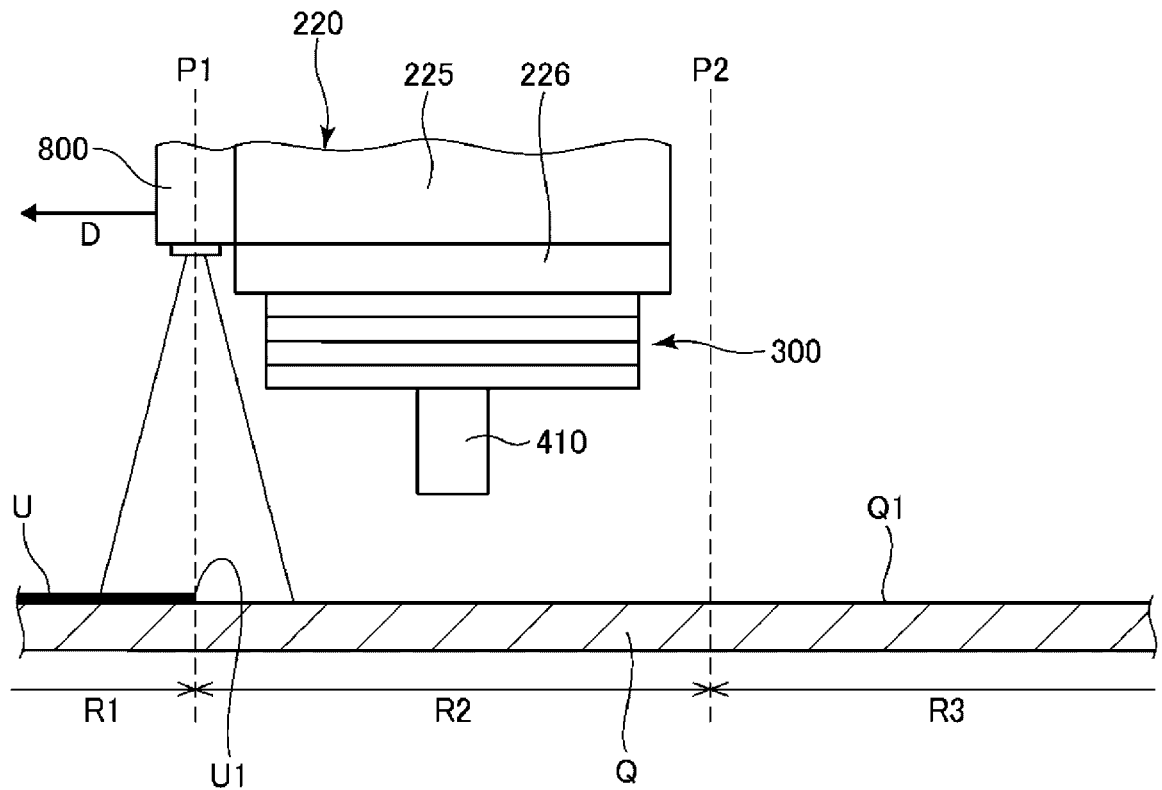
FIG. 10 is a diagram for explanation of a motion of the robot system at the printing step.

At the correction step S222, first, as shown in FIG. 10, with the robot arm 220 maintained in the second attitude, the printing face Q1 is imaged by the camera 800. Then, the work reference point P0 contained in the image data D obtained by the imaging is recognized by image recognition. In the embodiment, an end portion U1 of a pattern U printed in the region R1 at the region R2 side is used as the work reference point P0.

As described above, in the embodiment, the camera 800 is the spectroscopic camera and may acquire spectroscopic data (spectral information) with respect to each pixel. Accordingly, the image recognition of the work reference point P0 may be performed more accurately. Further, to position the work reference point P0 within the field of view of the camera 800 more reliably, in the embodiment, the second attitude (particularly, the orientation of the arm 225) is determined to position the camera 800 at the region R1 side of the robot arm 220. Note that the orientation of the camera 800 in the second attitude is not particularly limited as long as the camera may capture an image containing the work reference point P0.

Figure 11:
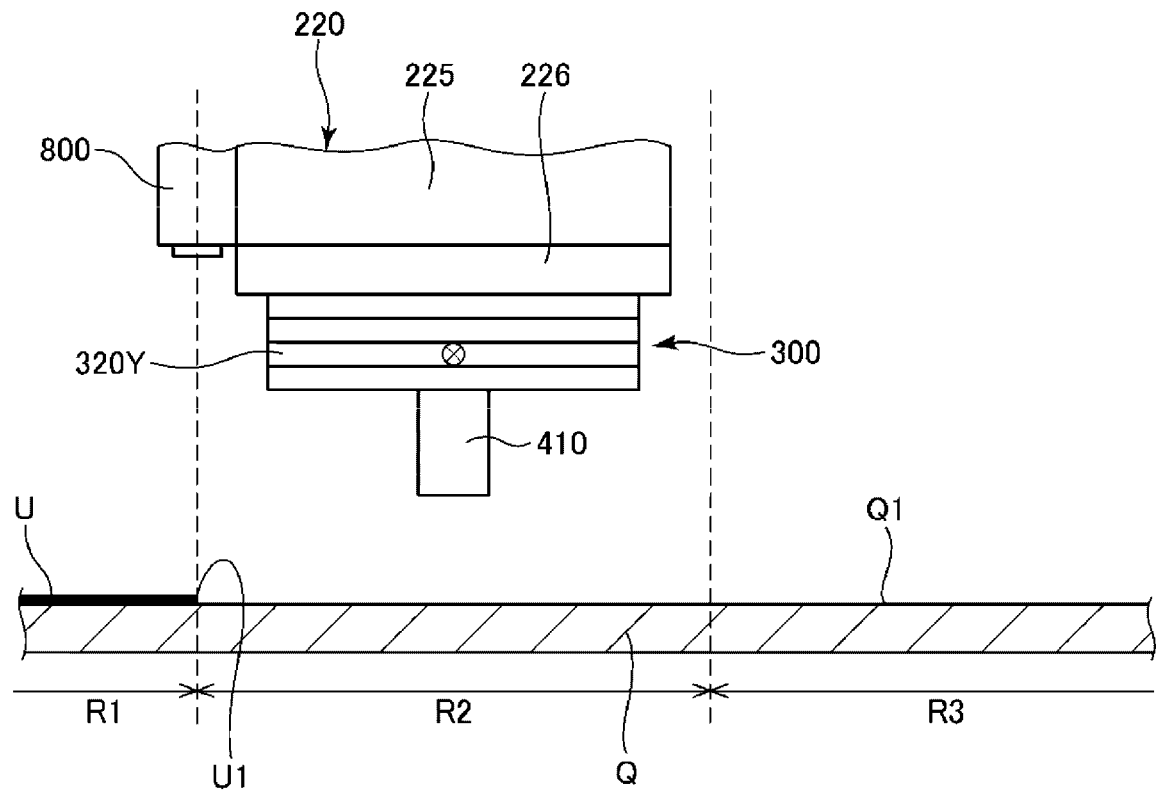
FIG. 11 is a diagram for explanation of a motion of the robot system at the printing step.

Then, as shown in FIG. 11, the position of the inkjet head 410 is corrected based on the work reference point P0 by driving of the moving stage 300 with the robot arm 220 maintained in the second attitude. In the example shown in FIG. 11, the Y stage 320Y is moved in the Y-axis direction, and thereby, the position of the inkjet head 410 is corrected.

Specifically, first, the real position of the inkjet head 410 is detected based on the position of the work reference point P0 within the image data D. Then, a difference between the detected position of the inkjet head 410 and the target position is detected. Then, the position of the inkjet head 410 is corrected to be the target position based on the detected difference. The position correction of the inkjet head 410 is performed by driving of the moving stage 300 with the robot arm 220 maintained in the second attitude. Thereby, the position correction of the inkjet head 410 may be accurately performed. Particularly, in the embodiment, the moving stage 300 has the configuration at the degree of freedom of three axes of the X stage 320X, the Y stage 320Y, and the θ stage 320θ, and therefore, the position correction of the inkjet head 410 may be performed more accurately.

Then, the working step S223 is performed with the robot arm 220 maintained in the second attitude. At the working step S223, first, as shown in FIG. 12, the inkjet head 410 is moved to the movement start position P1 by driving of the moving stage 300. Then, as shown in FIG. 13, while the inkjet head 410 is moved from the movement start position P1 to the movement end position P2 by driving of the moving stage 300 along the arrow N, printing in the region R2 is performed by ejection of the ink from the inkjet head 410 with predetermined timing.

According to the unit printing step S22, printing misalignment at the joint between the regions R1, R2 may be effectively suppressed and lowering of the printing quality may be effectively suppressed. Further, the robot arm 220 is stopped as described above, and thereby, without influences by vibration due to motors and reducers driving in the joints of the robot arm 220 and variations in trajectory, when the moving stage 300 is driven, accurate printing may be performed along the movement direction because the inkjet head slides along the linear guides of the moving stage 300.

Subsequent to the unit printing step S22, the unit printing steps S23, S24 are performed in the same manner, and thereby, printing on the entire printing face Q1 ends. As shown in FIG. 3, when the printing on the printing face Q1 ends, whether or not printing work on a predetermined number of objects Q is finished is determined, and, when the printing work is finished, the work by the robot system 100 ends. On the other hand, when the printing work is not finished, a new object Q is refixed to the fixing member 700 and printing work is performed from the printing step S2.

As above, the robot system 100 of the embodiment is explained. As described above, the control method for the robot system 100 is a control method for the robot system 100 including the moving stage 300, the tool 400 attached to the moving stage 300, the robot arm 220 holding one of the moving stage 300 and the object Q, and the camera 800 and performing predetermined work on the object Q using the tool 400, including the robot arm driving step S211 of setting the robot arm 220 in the first attitude, the working step S212 of performing work in the region R1 as the first region of the object Q while moving the tool 400 relative to the object Q by the moving stage 300 with the first attitude maintained, the robot arm driving step S221 of setting the robot arm 220 in the second attitude, the correction step S222 of imaging the object Q using the camera 800 and correcting the position of the tool 400 based on the imaging result by driving of the moving stage 300 with the second attitude maintained, and the working step S223 of performing work in the region R2 as the second region of the object Q while moving the tool 400 relative to the object Q by the moving stage 300 with the second attitude maintained. According to the control method, work misalignment at the joint between the regions R1, R2 may be effectively suppressed and lowering of the work quality may be effectively suppressed.

As described above, the robot arm 220 holds the moving stage 300. Thereby, work on the object Q is easily performed. Further, as described above, the moving stage 300 holds the tool 400. Thereby, work on the object Q is easily performed.

As described above, in the control method for the robot system 100, the moving stage 300 has the piezoelectric actuators 340 as the drive sources. Thereby, the size and weight of the moving stage 300 may be reduced. Further, driving accuracy of the moving stage 300 is improved and the tool 400 is easily moved at a constant speed.

As described above, the tool 400 is the inkjet head 410 as the printer head. Thereby, printing work on the object Q may be performed. Accordingly, the highly convenient robot system 100 is obtained.

As described above, at the correction step S222, the position of the tool 400 is corrected based on a work trace formed in the region R1, i.e., the printed pattern U. Thereby, the correction of the tool 400 may be easily and accurately performed.

As described above, the camera is placed in the robot 200. Thereby, the object Q is easily imaged. Further, for example, in comparison to a case where the camera 800 is placed on the moving stage 300 like a second embodiment, which will be described later, the load on the moving stage 300 is lower and the acceleration and deceleration of the moving stage 300 may be set to be higher by the smaller load. Accordingly, the time taken for the work may be shortened and the productivity is improved.

As described above, the camera 800 is the spectroscopic camera. Thereby, the image recognition at the correction step S222 may be performed with higher accuracy.

As described above, the robot system 100 is the robot system 100 including the moving stage 300, the tool 400 attached to the moving stage 300, the robot arm 220 holding one of the moving stage 300 and the object Q, and the camera 800 and performing predetermined work on the object Q using the tool 400, setting the robot arm 220 in the first attitude, performing work in the region R1 as the first region of the object Q while moving the tool 400 relative to the object Q by the moving stage 300 with the first attitude maintained, setting the robot arm 220 in the second attitude, imaging the object Q using the camera 800 and correcting the position of the tool 400 based on the imaging result by driving of the moving stage 300 with the second attitude maintained, and performing work in the region R2 as the second region of the object Q while moving the tool 400 relative to the object Q by the moving stage 300 with the second attitude maintained. According to the robot system 100 having the above described configuration, work misalignment at the joint between the regions R1, R2 may be effectively suppressed and lowering of the work quality may be effectively suppressed.

As above, the robot system 100 is explained, however, the robot system 100 is not particularly limited. For example, in the embodiment, the arrow N as the movement direction of the inkjet head 410 at the printing step S2 is along the arrangement direction of the regions R1, R2, R3, R4 (the movement direction of the robot arm 220), however, for example, as shown in FIG. 14, the movement direction of the inkjet head 410 in the respective regions R1, R2, R3, R4 may be orthogonal (cross) the arrangement direction of the regions R1, R2, R3, R4. Or, as shown in FIG. 15, the movement direction of the inkjet head 410 in the respective regions R1, R2, R3, R4 may two-dimensionally meander. Or, the regions R are arranged in a line in the embodiment, however, as shown in FIG. 16, the regions may be arranged in two or more lines.

Or, a plurality of the cameras 800 may be placed on the robot arm 220. For example, in the example shown in FIG. 17, the two cameras 800 may be placed on the arm 225 to oppose via the arm 225. According to the configuration, image data D in a wider field of view may be acquired using the two cameras 800. Further, at the correction step S222, it is only necessary to acquire the image data D containing the end portion U1 (work reference point P0) by one of the cameras 800, and the degree of freedom of the second attitude is higher and driving of the robot arm 220 may be made more efficient.

Second Embodiment

Figure 18:
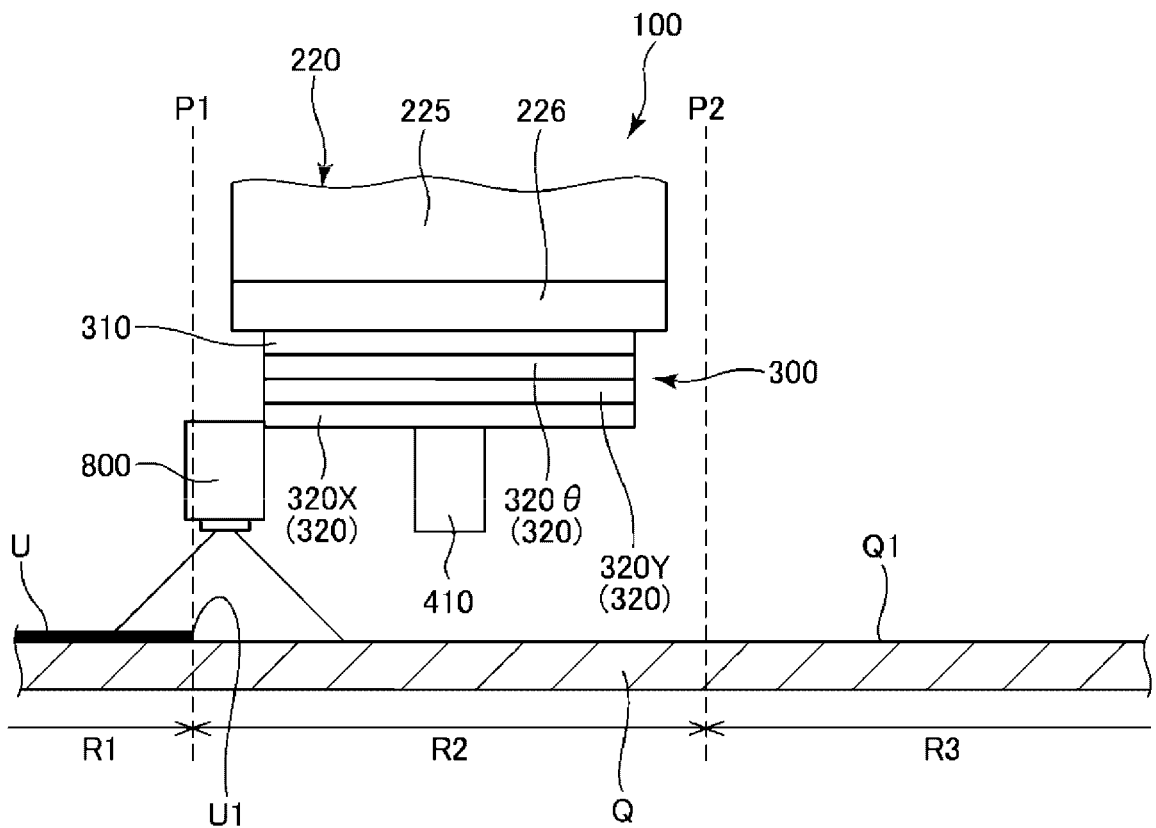
FIG. 18 shows a robot system according to a second embodiment.

FIG. 18 shows a robot system according to the second embodiment.

A robot system 100 of the embodiment is the same as the robot system 100 of the above described first embodiment except that the placement of the camera 800 is different.

Accordingly, in the following description, the embodiment will be explained with a focus on the differences from the above described first embodiment and the explanation of the same items will be omitted. Further, in the respective drawings in the embodiment, the same configurations as those of the above described embodiment have the same signs.

As shown in FIG. 18, in the embodiment, the camera 800 is placed on the stage 320 of the moving stage 300, particularly, on the X stage 320X. Thereby, even in the state in which the robot arm 220 is maintained in the second attitude, the camera 800 may be moved by driving of the moving stage 300. Accordingly, the imageable range of the camera 800 in the second attitude becomes wider and, at the correction step S222, the work reference point P0 on the printing face Q1 may be imaged more reliably. Further, in a case where the work reference point P0 is larger and the entire range is not captured by one image or the like, the work reference point P0 may be recognized based on a plurality of pieces of image data D obtained by imaging from different positions.

As described above, in the control method for the robot system 100 of the embodiment, the camera 800 is placed on the moving stage 300. Thereby, even in the state in which the robot arm 220 is maintained in the second attitude, the camera 800 may be moved by driving of the moving stage 300. Accordingly, the imageable range of the camera 800 in the second attitude becomes wider and, at the correction step S222, the work reference point P0 on the printing face Q1 may be imaged more reliably.

According to the second embodiment, the same effects as those of the above described first embodiment may be exerted.

Third Embodiment

Figure 19:
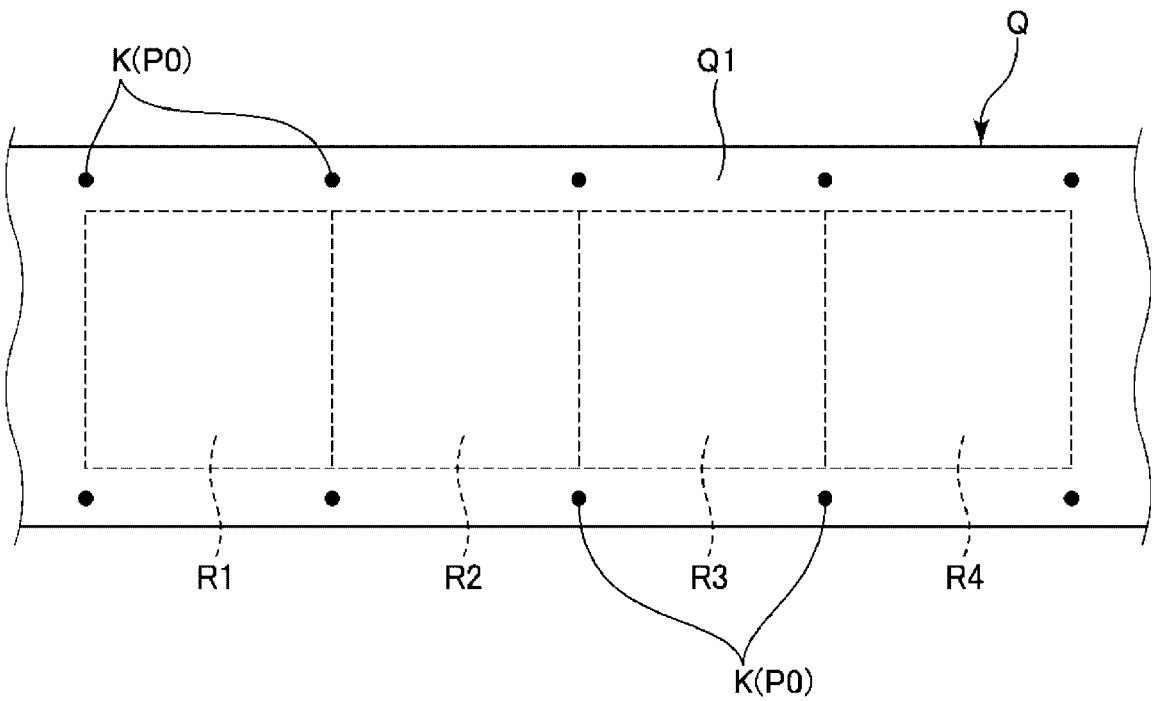
FIG. 19 shows work reference points P0 used in a robot system in a third embodiment.

FIG. 19 shows work reference points P0 used in a robot system in a third embodiment.

A robot system 100 of the embodiment is the same as the robot system 100 of the above described first embodiment except that the work reference point P0 is different. Accordingly, in the following description, the embodiment will be explained with a focus on the differences from the above described first embodiment and the explanation of the same items will be omitted. Further, in the respective drawings in the embodiment, the same configurations as those of the above described embodiment have the same signs.

As shown in FIG. 19, in the embodiment, markers K placed on the printing face Q1 are used as the work reference points P0. The markers K are not particularly limited as long as the markers can be distinguished, and may be formed by provision of pits and projections, printing, or the like.

At the correction step S222 of the embodiment, first, the printing face Q1 is imaged by the camera 800 with the robot arm 220 maintained in the second attitude. Then, the markers K contained in the image data D obtained by the imaging are image-recognized as the work reference points P0. Then, the real position of the inkjet head 410 is detected based on the positions of the markers K within the image data D and the position of the inkjet head 410 is corrected based on a difference from the target position. In the above described first embodiment, it may be difficult to recognize the work reference point P0 depending on the pattern U. On the other hand, in the embodiment, the markers K placed on the printing face Q1 in advance are used as the work reference points P0, and the work reference points P0 may be recognized more accurately and more reliably.

As described above, in the control method for the robot system 100 of the embodiment, at the correction step S222, the position of the tool 400 is corrected based on the makers K placed on the object Q. Thereby, the work reference points P0 may be recognized more accurately and more reliably.

According to the third embodiment, the same effects as those of the above described first embodiment may be exerted.

Fourth Embodiment

Figure 20:
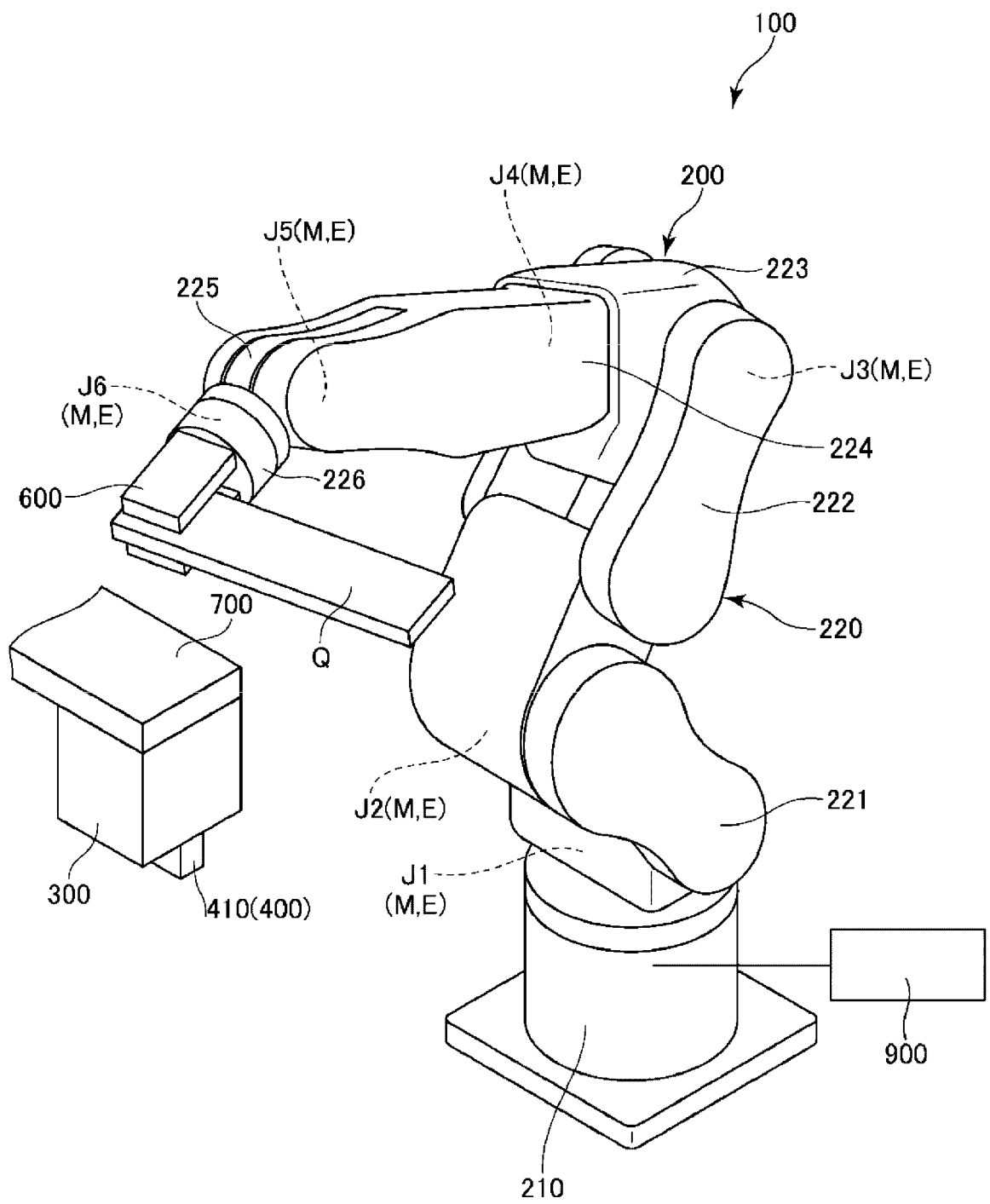
FIG. 20 is a perspective view showing an overall configuration of a robot system in a fourth embodiment.

FIG. 20 is a perspective view showing an overall configuration of a robot system in a fourth embodiment.

A robot system 100 of the embodiment is the same as the robot system 100 of the above described first embodiment except that the placement of the moving stage 300 and the tool 400 is different. Accordingly, in the following description, the embodiment will be explained with a focus on the differences from the above described first embodiment and the explanation of the same items will be omitted. Further, in the respective drawings in the embodiment, the same configurations as those of the above described embodiment have the same signs.

As shown in FIG. 20, in the embodiment, a hand 600 is placed in the distal end portion of the robot arm 220, i.e., the arm 226, and the hand 600 grips the object Q in work. On the other hand, the moving stage 300 is fixed to the fixing member 700 apart from the robot arm 220 and the inkjet head 410 is placed on the moving stage 300.

According to the fourth embodiment, the same effects as those of the above described first embodiment may be exerted. Note that, in addition, for example, the hand 600 may be coupled to the arm 226 via the moving stage 300 and the inkjet head 410 may be fixed to the fixing member 700 apart from the robot arm 220. Further, the inkjet head 410 may be coupled to the arm 226 and the hand 600 may be coupled to the fixing member 700 via the moving stage 300 apart from the robot arm 220.

As above, the control method for the robot system and the robot system according to the present disclosure are explained based on the illustrated embodiments, however, the present disclosure is not limited to those. The configurations of the respective parts may be replaced by arbitrary configurations having the same functions. Further, any other configuration may be added to the present disclosure. Furthermore, the respective embodiments may be appropriately combined.

Moreover, the tool 400 is not limited to the inkjet head 410, but includes a tool for laser processing, a tool for soldering work, a tool for welding, and a tool for work performed in synchronization with a movement trajectory of a tool.

What is claimed is:

1. A control method for a robot system including a moving stage, a tool attached to the moving stage, a robot arm holding one of the moving stage and an object, and a camera and performing predetermined work on the object using the tool, comprising:

setting the robot arm in a first attitude;
performing the work in a first region of the object while moving the tool relative to the object by the moving stage with the first attitude maintained;
setting the robot arm in a second attitude;
imaging the object using the camera and correcting a position of the tool by driving of the moving stage based on an imaging result with the second attitude maintained; and performing the work in a second region of the object while moving the tool relative to the object by the moving stage with the second attitude maintained.

2. The control method for a robot system according to claim 1, wherein
the robot arm holds the moving stage.

3. The control method for a robot system according to claim 2, wherein
the moving stage holds the tool.

4. The control method for a robot system according to claim 1, wherein
the moving stage has a piezoelectric actuator as a drive source.

5. The control method for a robot system according to claim 1, wherein
the tool is a printer head.

6. The control method for a robot system according to claim 1, wherein
at correcting, the position of the tool is corrected based on a work trace formed in the first region.

7. The control method for a robot system according to claim 1, wherein
at correcting, the position of the tool is corrected based on a maker placed on the object.

8. The control method for a robot system according to claim 1, wherein
the camera is placed in the robot.

9. The control method for a robot system according to claim 1, wherein
the camera is placed on the moving stage.

10. The control method for a robot system according to claim 1, wherein
the camera is a spectroscopic camera.

11. A robot system including a moving stage, a tool attached to the moving stage, a robot arm holding one of the moving stage and an object, and a camera and performing predetermined work on the object using the tool,
setting the robot arm in a first attitude,
performing the work in a first region of the object while moving the tool relative to the object by the moving stage with the first attitude maintained,
setting the robot arm in a second attitude,
imaging the object using the camera and correcting a position of the tool by driving of the moving stage based on an imaging result with the second attitude maintained, and
performing the work in a second region of the object while moving the tool relative to the object by the moving stage with the second attitude maintained.

12. The control method for a robot system according to claim 1, wherein
in the first attitude, the movable range of the tool by driving of the moving stage overlaps with the entire the first region.

13. The control method for a robot system according to claim 1, wherein
in the second attitude, the movable range of the tool by driving of the moving stage overlaps with the entire the second region.

* * * * *